3,810,851
FLAME RETARDANT FLEXIBLE POLYURETHANE FOAMS

Arthur J. Norman, Tallmadge, and David S. Cobbledick, Kent, Ohio, assignors to The General Tire & Rubber Company
No Drawing. Continuation-in-part of abandoned application Ser. No. 248,502, Apr. 28, 1972. This application Apr. 13, 1973, Ser. No. 350,852
Int. Cl. C08g 22/44
U.S. Cl. 260—2.5 AJ    14 Claims

ABSTRACT OF THE DISCLOSURE

Low density, flexible and semiflexible polyetherurethane foams containing halogen-containing polymers such as polyvinyl chloride are rendered resistant to flame to the point of being self-extinguishing by the use of minor amounts of alumina trihydrate and antimony trioxide. Part of the halogen-containing polymer may be replaced with a chlorinated paraffin.

CROSS-REFERENCE TO RELATED APPLICATION

This application is a continuation-in-part of U.S. patent application Ser. No. 248,502, filed Apr. 28. 1972 and now abandoned.

BACKGROUND OF THE INVENTION

Flexible and semiflexible polyurethane foams have found widespread utility in the fields of insulation, structural reinforcement, cushioning and electrical encapsulation. One factor limiting the commercial utilization of such foams has been their flammability when exposed to flame or high temperatures. The use of a combination of antimony oxide and finely-divided vinyl halide resin is specifically shown in U.S. Pat. No. 3,075,928. Flame retardant polyurethane foams containing zinc oxide, polyvinyl chloride and antimony trioxide are disclosed in U.S. Pat. No. 3,574,149. Flame retardant polyurethane foams containing a mixture of alumina trihydrate and a chlorinated organic phosphate are disclosed in U.S. Pat. No. 3,262,894. This last patent states that by itself the alumina trihydrate does not provide a self-extinguishing foam, and it fails to disclose zinc oxide, antimony trioxide or polyvinyl chloride.

Accordingly, it is the primary object of this invention to provide flexible and semiflexible, low density polyetherurethane foams which contain halogen-containing polymers and which have the property of flame-resistance even to the point of being self-extinguishing. It is a further object to provide a method for making such foams by the use of a simple but novel combination of additives.

These and other objects and advantages of the present invention will become more apparent to those skilled in the art from the following detailed description and examples.

SUMMARY OF THE INVENTION

According to the present invention it has now been discovered that flexible and semiflexible polyetherurethane foams are rendered not only flame-resistant but also self-extinguishing by incorporating into the foam composition, prior to the blowing thereof into a foam, alumina trihydrate ($Al_2O_3 \cdot 3H_2O$ or $2Al(OH)_3$) and antimony trioxide together with a finely-divided halogen-containing solid polymer. Part of the halogen containing polymer can be replaced with a chlorinated paraffin.

DESCRIPTION OF DETAILS AND PREFERRED EMBODIMENTS

The polyurethane foaming composition or formulation must contain per 100 parts by weight of the organic polyol from about 30 to 80 parts, preferably about 45 to 75 parts, of alumina trihydrate and from about 1 to 20 parts, preferably about 3 to 15 parts, of antimony trioxide ($Sb_2O_3$).

The halogen-containing solid polymers employed herein include polymers, usually resinous in character, of vinyl chloride, vinyl bromide, vinyl fluoride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major amount of the vinyl halide and a minor amount of vinyl acetate. Moreover, other resinous polymers can be used such as chlorinated rubber, chlorinated polyethylene, chlorinated polyvinyl chloride, polytetrafluoroethylene and the like. Mixtures of the halogen-containing polymeric resins can be used.

These halogen-containing resins should be finely divided (powders having average particle sizes of from about 0.00001 to 1 mm.) and have an intrinsic viscosity of from about 0.25 to 2.5, preferably from about 0.5 to 1.5. The halogen-containing resinous polymers are generally used in an amount of from about 2 to 100 parts by weight per 100 parts by weight of the polyol to obtain the desired load bearing characteristics, but in many instances there need be only about 5 to 50 parts, preferably from about 15 to 35 parts by weight. The larger particle size resins can be used in larger amounts within the given ranges. However, the finer or smaller particle size resins should be used in smaller amounts within the ranges shown to avoid the formation of viscous, difficult to pump or stir, fluids, gels or pastes. The halogen-containing polymers can be made by bulk, solvent, emulsion or suspension polymerization process. A preferred polymer to use is polyvinyl chloride.

Part of the halogen-containing resin used in the foam formulation can be replaced with a chlorinated paraffin or with mixtures of chlorinated paraffins. These materials are made by the chlorination of liquid paraffin fractions and/or paraffin waxes. The chlorinated paraffins have average molecular weights of from about 250 to 1400 and chlorine contents of from about 40 to 70% by weight. They can be liquids or solids; preferably the liquid chlorinated paraffins are employed in the practice of the present invention. Also, it is preferred that the chlorinated paraffins be odor-free or substantially odor-free. Examples of chlorinated paraffins are the Cereclor (I.C.I. America, Inc.) chlorinated paraffins Nos. 42, S. 45, S. 52, and 70, and the Chlorowax (Diamond Shamrock Chemical Company) chlorinated paraffins Nos. 40, 50 and 70. Still other chlorinated paraffins can be used. From about 5 to 70% by weight of the chlorinated paraffin can be used to replace an equal amount by weight of the halogen-containing polymer.

The alumina trihydrate should be finely divided, for example, it should have an average particle size of from about 0.1 to 200 microns, preferably from about 1 to 50 microns. While it may be refined or unrefined, it should not contain any appreciable amount of impurities which would adversely affect the foaming reaction or the properties of the resulting foams.

The antimony trioxide, also, should be finely divided, for example, it should have an average particle size of from about 0.1 to 200 microns, preferably from about 1 to 50 microns. It should not contain any deleterious materials which would adversely affect the foaming reaction or the properties of the resulting foam. The smaller particle sizes of antimony trioxide are most effective in the foam.

Polyols used in making the polyurethanes of the present invention are primary and secondary hydroxy-terminated polyoxyalkylene ethers having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, tris(hydroxyphenyl) propane, triethanolamine, triisopropanolamine, ethylenediamine, and ethanolamine. Linear and branched copolyethers of ethylene oxide and propylene oxide are also useful in making the foamed products of this invention as well as those end-blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by reference to the following general formulae:

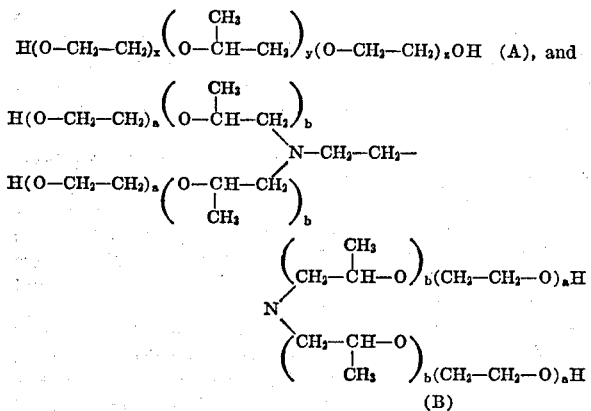

where in Formula A the total of subscripts, $x$, $y$, and $z$ represent positive integers in the range of from 20 to 70 and the total of subscripts $a$ and $b$ of Formula B represent positive integers in the range of from 20 to 100.

Polyetherpolyols having a branched chain network are also useful. Such branched chain polyethers are readily prepared from alkylene oxides of the type above described and initiators having a functionality greater than two. Branched polyethers have the advantage of making possible cross linking without the interaction or urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in the U.S. patents to Stamberger, Nos. 3,304,273 and 3,383,351 and in the U.S. patent to Von Bonin, No. 3,294,711.

When desired, cross-linking materials having from 2 to 8 hydroxyl groups can be included in the foam formulation to increase crosslink density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, trimethylolpropane, butane triols, hexanetriols, trimethylolphenol, tris(hydroxyphenyl)propane, tris(hydroxyxylyl)propane, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or copolymers thereof, e.g., copolymers of ethylene and propylene oxides. Grafted crosslinkers can be prepared by the process of the aforementioned Stamberger and Von Bonin U.S. patents. Mixtures of crosslinkers can be used. All the polymer-forming ingredients should preferably be free of any amine function which is not sterically hindered or shielded.

Any organic di- or tri-isocyanate can be used in the practice of the present invention. Diisocyanates are preferred, particularly when there is any considerable amount of branching in the polyol or crosslinker to avoid the formation of rigid or semi-rigid foams and vice versa. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidene diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanate; cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyante, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xyyene-1,3-diisocyanate, bis(4-isocyanatophenyl) methane, bis(3-methyl-4-isocyanatophenyl)methane, and 4,4'-diphenylpropane diisocyanate, durylene diisocyanate, 4,4',4''-tris(isocyanatophenyl)methane, 3,10-diisocyanatotricyclo[5.2.1.0$^{2,6}$] decane, bis-(2-isocyanatoethyl) carbonate, and naphthalene triisocyanate and the like. Mixtures of polyisocyanates can be used.

The polyisocyanate is used in an amount sufficient to react with the active hydrogen atoms (as determined by the Zerewitinoff method, J.A.C.S., vol. 49, p. 3181 (1927)) in the polyols, crosslinkers, water, halogen-containing resins (such as partially hydrolzed vinyl chloride-vinyl acetate copolymers) and any other active hydrogen-containing material in the polyurethane foam formulation to provide the desired degree of crosslinking, chain extension, urea groups, blowing and so forth to obtain the desired flexibility, strength and other physical properties.

Water is used as a blowing agent and is employed in amounts of from about 1.0 to 5.5 parts by weight per 100 parts by weight of the polyol.

The water should be substantially or essentially pure, that is, it should be free of impurities such as ions, sols, etc. of mineral, vegetable or synthetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about $-40°$ C. and $+170°$ C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro - 2,2,2 - trifluoroethane, 2-chloro - nona - fluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth, and mixtures thereof, particularly where precautions are taken to prevent explosions or where removal of the gasses is provided. See U.S. Pats. Nos. 3,072,582 and 3,391,093.

Catalysts for the polyetherpolyol-polyisocyanate reaction can be any catalyst heretofore used in the art particularly the metal-containing catalysts. Examples of such catalysts are (1) tertiary phosphines such as trialkylphosphines, dialkyl-benzylphosphines, and the like; (2) strong bases such as the alkali and alkaline earth metal hydroxides, alkoxides, and phenoxides; (3) acidic metal salts of strong acids such as ferric chloride, stannic chloride, stannous chloride, antimony trichloride, bismuth nitrate, bismuth chloride, and the like; (4) chelates of various metals such as those which can be obtained from acetylacetone, benzoylacetone, trifluoroacetylacetone, ethyl acetoacetate, salicylaldehyde, cyclopentanone-2-carboxylate, and the like, with various metals such as Be, Mg, Zn, Cd, Pb, Ti, Zr, Sn, As, Bi, Cr, Mo, Mn, Fe, Co, Ni, or ions such as $MoO_2^{++}$ and the like; (5) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (6) salts of organic acids with metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese, cobalt, lead naphthenate and the like; (7) organometallic derivatives of tetravalent tin, trivalent and pentavalent As, Sb, and Bi, and metal carbonyls of iron and cobalt; and (8) the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin - bis(6 - methylaminocaproate), and the like; as well as a trialkyltin hydroxide, dialkyltin oxide, dialkyltin, dialkoxide, or a dialkyltin dichloride, such as trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis (2-methylaminopentylate), dibutyltin dichloride, dioctyltin dichloride, and the like and mixtures thereof. Preferred catalyts to use are the divalent tin salts of carboxylic acids having from 2 to 18 carbon atoms. These catalysts are used in an amount of from about 0.1 to 0.9 part by weight per 100 parts by weight of the polyetherpolyol. It is less preferable to use these catalysts, such as the metal salts, alcoholates, hydroxides, alkoxides and phosphines, especially in large amounts, where resins containing ester groups in a substantial amount are used since they tend to hydrolyze the ester linkages thereby causing scission of the backbone polymer chain and lowering of the physical and chemical properties of the resulting foams and so forth, especially under conditions of high temperature and humidity.

Surfactants or emulsifiers are generally necessary to provide the desired cell formation and growth. Polysiloxane-polyoxyalkylene block copolymers are preferred. Polysiloxane-polyoxyalkylene block copolymers are described in U.S. Pats. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Still other polysiloxane-polyoxyalkylene copolymers known to the art may be employed as well as silicones, Turkey red oil and so forth. The surfactant is used in an amount of from about 0.3 to 2.5 parts by weight per 100 parts by weight of the polyether polyol.

It is advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where a metal catalyst is used for the urethane-forming reaction, it is preferred to use only from about 0.05 to 0.9 part by weight of the amine. On the other hand, where the tertiary amine is taking care of both the foaming ($H_2O+NCO$) and network.

(—ROH+NCO)

reactions, the tertiary amines should be used in somewhat larger amounts within the specified ranges. However, since some polyols may differ in residual acid content (from neutralization of KOH catalyst (used to form polyol) with acid) due to incomplete washing, filtering or ion-exchanging of the neutralized polyol and since antimony trioxide has some catalytic effect during the polyurethane foaming and forming reactions, the amount of tertiary amine may necessarily have to be reduced where large amounts of water are used as the primary blowing agent.

In the urethane compositions of the invention there may be used a wide variety of organic tertiary amine catalysts. Such organic amines, include, among others, triethylene diamine, triphenyl amine, triethylamine, N,N,N',N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N',N'-tetramethyl propane diamine, trimethyl aminoethyl piperazine, N,N-dimethyl ethanolamine, dimethyl hexadecylamine, 1-(2-ethyl-1-hexenyl) piperazine, tri-n-octaylamine, trimethylamine, N,N-dimethyl benzyl amine, triethanolamine, 1,2,4-trimethylpiperazine, N-methyl dicyclohexylamine, and mixtures thereof. The sterically hindered organic tertiary amines, especially those disclosed in Canadian Pat. No. 855,757 of Edwin M. Maxey and John T. Harrington, entitled "Urethane Foams Containing Halogen Containing Polymers and Methods for Preparing the Same Using Certain Catalysts," issued Nov. 10, 1970, also, can be employed in the foam formulations if desired.

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red iron oxide, conventioanl stabilizers, carbon black, dyes, toners, extending oils, processing oils, epoxided soy bean oil (Paraplex G-62), epoxides (Epon 828), tricrsyl phosphate, plasticizers, antioxidants, fungicides, bacteriostats, reodorants and the like. These constituents can be added in various amounts to the foaming ingredients to achieve the desired properties in the resultant flexible, low density foams.

The flexible, cellular urethane-vinyl chloride polymeric foams of the present invention can be used as cushions, mattresses, pillows, packing, cushioning material for furniture, automobiles, rug underlay, interior automobile and other vehicle door panels, seats, arm rests, head rests, and so forth.

The preparation of the polyurethane foam of the present invention can be formed by a process known in the art as the "one-shot" process or by a two step process involving, first, the preparation of a "prepolymer," the well known "semiprepolymer" or "quasi-prepolymer" technique. There all or a portion of the polyol is reacted with all of the organic polyisocyanate, providing a reaction product which contains a high percentage free isocyanate groups and which is reacted with the remaining portion of the hydroxyl-terminated polyol or a crosslinker, together with water, catalysts, metal oxides and the halogen-containing polymer to form a rubbery, cellular, elastic product.

No matter which particular technique is used, the halogen-containing polymer or resin may not only be dispersed with the polyol alone, but alternatively with the organic polyisocyanate alone. Still another method within the purview of the present invention involves dispersing the halogen-containing polymer with a combination of the polyol and the organic polyisocyanate. In any case, it is advantageous to disperse the halogen-containing polymer thoroughly into whatever particular initial composition is used.

The following examples are intended to illustrate more fully but not to limit the invention which is properly delineated in the claims.

EXAMPLE I

The polyol, polyvinylchloride, water, alumina trihydrate, antimony trioxide, surfactant, amine catalysts and processing oil were mixed together to form a polyol blend. The blend was then thoroughly mixed with the tin catalyst in DOP as a carrier and the tolylene diisocyanate and poured into a mold and allowed to foam for several minutes. After this, the foam was placed in an oven at 250° F. and cured at this temperature for several minutes. Similar foams were made in which the ingredients were varied and wherein antimony trioxide were omitted from the formulation.

After curing and cooling, samples were cut from the foam and they were given various tests to show their physical properties and resistance to flammability.

The ingredients of the foam formulations and the results obtained on testing the flexible foams are shown in the table below:

TABLE

| Run | A | B | C | D | E | F |
|---|---|---|---|---|---|---|
| Foam ingredients, parts by weight: | | | | | | |
| Poly G-3030 PG [1] | 100.0 | 100.0 | 100.0 | 100.0 | 100.0 | 100.0 |
| $H_2O$ (deionized) | 2.5 | 2.5 | 2.5 | 2.5 | 2.5 | 2.5 |
| L-540 [2] | 0.75 | 0.75 | 0.75 | 0.75 | 0.75 | 0.75 |
| T-9 [3] | 0.5 | 0.5 | 0.5 | 0.6 | 0.6 | 0.6 |
| A-1 [4] | 0.1 | 0.1 | 0.1 | 0.1 | 0.1 | 0.1 |
| Polycat 12 [5] | 0.2 | 0.2 | 0.2 | 0.2 | 0.2 | 0.2 |
| Marvinol 51 [6] | 20.0 | 20.0 | 20.0 | 30.0 | 30.0 | 30.0 |
| Alumina trihydrate [7] | 50.0 | 50.0 | 50.0 | 70.0 | 70.0 | 70.0 |
| Antimony trioxide [8] | | 3.0 | 5.0 | | 3.0 | 5.0 |
| Dactol [9] | 5.0 | 5.0 | 5.0 | 5.0 | 5.0 | 5.0 |
| TDI [10] | 36.0 | 36.0 | 36.0 | 36.0 | 36.0 | 36.0 |
| Foam properties: | | | | | | |
| Density (lbs./ft.$^3$) | 3.50 | 3.55 | 3.55 | 4.00 | 4.10 | 4.10 |
| Tensile strength (p.s.i.) | 13.0 | 13.3 | 13.0 | 13.3 | 13.5 | 13.2 |
| Elongation (percent) | 90 | 107 | 116 | 82 | 80 | 80 |
| Tear strength (p.l.i.) | 1.73 | 1.58 | 1.6 | 1.35 | 1.28 | 1.48 |
| Comp. load defl.: | | | | | | |
| 25% | 36.2 | 38.8 | 38.7 | 41.2 | 46.2 | 46.2 |
| 65% | 93.7 | 100.0 | 96.2 | 126.0 | 127.5 | 126.2 |
| 25% R | 28.7 | 32.5 | 31.2 | 32.5 | 37.5 | 37.5 |
| Compression set (percent) (50% Method B) | 9.1 | 9.7 | 9.9 | 10.0 | 11.4 | 11.8 |
| Flammability (ASTM D-1692-68) | Burns | (11) | (12) | Burns | (13) | (14) |
| Initial rate (″/min.) | 1.75 | 0.6 | 0.4 | 0.75 | 0.5 | (14) |
| After heat aging (″/min.) (22 hrs. at 284° F.) | 1.5 | 0.25 | 0.25 | 0.6 | 0.75 | (14) |
| Weight loss after heat aging (percent) (22 hrs. at 284° F.) | 3.0 | 0.35 | 0.3 | 0.4 | 0.36 | 0.35 |

[1] Propylene oxide adduct of glycerol, secondary hydroxyl triol, 3,000 M.W., approximate analysis: OH No. 56.3, Acid No. 0.038, $H_2O$ 0.018%, Olin Corporation.
[2] Polysiloxane-polyoxyalkylene block copolymer, surfactant, Union Carbide.
[3] Stannous octoate in a carrier; 1 part of stannous octoate in 2 to 4 parts of dioctyl phthalate. The figure shown in the column is for the stannous octoate per se.
[4] $O(-CH_2-CH_2-N(CH_3)_2)_2$ in a carrier (70% by weight in dipropylene glycol). The figure shown in the column is for the amine per se.
[5] Methyl dicyclohexyl amine.
[6] Polyvinylchloride resin, average particle size of 1.7 microns, 0.50 specific viscosity, plastisol grade, Uniroyal, Naugatuck Chemical Division.
[7] Finely divided, Alcoa C-30 BD-A.
[8] Finely divided.
[9] Low viscosity, cell opening, processing oil, Houdry Process Corporation
[10] 80/20 mixture of 2,4- and 2,6-tolylene diisocyanates.
[11] Self-extinguishing time 130 sec.
[12] Self-extinguishing time 75 sec.
[13] Self-extinguishing time 30 sec.
[14] Would not ignite.

In the foregoing ASTM-D-1692-68 test a Bunsen burner flame having a blue cone of 1.5 inches in height is applied separately to the front edge of the foam test specimens (6 inches by 2 inches by 0.5 inch) and allowed to remain in contact therewith for a period of sixty seconds or until the one inch bench mark is reached. The "self-extinguishing time" is measured in seconds, and the "distance burned" is considered the furthermost point reached by the flame.

The above data clearly shows the improvement in flame resistance imparted to polyurethane foams containing a halogen-containing resin and antimony trioxide by the use of alumina trihydrate. Moreover, the foams containing the alumina trihydrate form a hard char at the flame front to insulate the flame front from the material in back of the flame rather than melt and drip hot burning material. Similar foams containing only polyvinylchloride (no $Sb_2O_3$ nor $Al_2O_3 \cdot 3H_2O$) burned, for example, they did not exhibit any self-extinguishing properties, when tested according to the foregoing test.

EXAMPLE II

Additional polyurethane foams were prepared by the method generally disclosed above and tested for their self-extinguishing properties by a modified test for mattress construction. The foam formulations were as follows.

FOAM FORMULATION NO. 1

| Ingredient: | Parts by weight |
|---|---|
| Voranol HR-5000 (Dow chemical Co., approximately 25% ethylene oxide and 75% propylene oxide adduct of a triol, about 4500 molecular weight, contains 1.7% bromine in the form of an organic compound) | 103.0 |
| LD-813 (Du Pont Co., mixture of methylene-bis-ortho chloro-aniline and methylene-tris-ortho chloro-aniline, functionality of about 2.5) | 5.0 |
| $H_2O$, deionized | 2.0 |
| A-1 (see Example I, above) | 0.12 |
| N-ethylmorpholine | 1.0 |
| DC-200 silicone fluid (Dow Corning Corp., polydimethylsiloxane oil) | 0.01 |
| Tolylene diisocyanate, 80/20, 2,4-/2,6- | 30.0 |

FOAM FORMULATION NO. 2

| Ingredient: | Parts by weight |
|---|---|
| Poly G-3030 PG* | 100.0 |
| L-540* | 1.0 |
| A-1* | 0.15 |
| T-9* | 0.40 |
| $H_2O$, deionized | 4.0 |
| Tolylene diisocyanate, 80/20, 2,4-/2,6- | 52.0 |

*See Example I, above.

FOAM FORMULATION NO. 3

| Ingredient: | Parts by weight |
|---|---|
| Poly G-3030 PG* | 100.0 |
| L-540* | 1.0 |
| A-1* | 0.15 |
| T-9* | 0.40 |
| $H_2O$, deionized | 4.0 |
| Tolylene diisocyanate, 80/20, 2,4-/2,6- | 52.0 |
| Polyvinylchloride resin [1] | 15 |
| Antimony trioxide, finely divided | 7 |
| Zinc oxide, French process, finely divided | 3 |

[1] Geon 121, emulsion polymerized, intrinsic viscosity of about 1.28, 100% through 200 mesh (less than about 74 microns), The B. F. Goodrich Co.
*See Example I, above.

FOAM FORMULATION NO. 4

| Ingredient: | Parts by weight |
|---|---|
| Poly G-3030 PG* | 100.0 |
| L-540* | 0.8 |
| Triethylene diamine (Dabco, Houdry Process Corporation) | 0.24 |
| Dactol* | 5.0 |
| $H_2O$, deionized | 2.2 |
| Freon 11, $Cl_3FC$ (Du Pont) | 11.0 |
| Alumina trihydrate, finely divided [1] | 50.0 |
| Antimony trioxide, finely divided | 5.0 |
| Polyvinyl chloride resin [2] | 30.0 |
| Tolylene diisocyanate, 80/20, 2,4-/2,6- | 31.5 |

[1] Alcoa C-30-BF, unrefined.
[2] Vygen 110, General Tire & Rubber Company, intrinsic viscosity 1.03, particle size range about 44–149 microns, suspension polymerized.
*See Example I, above.

The ability of the polyurethane foams to insulate cotton batting from ignition by both burning cigarettes and methenamine tablets (11) was investigated. The test for this work was as follows: 1 inch thick cotton batting was cut into 4" x 4" squares. Foam samples of desired thickness were also cut into 4" x 4" squares. Both cotton batting and foam samples were conditioned at least 48 hours at 70° F. and 50% relative humidity.

The cotton batting was placed on a sheet of aluminum foil inside a laboratory hood. The foam sample was placed on top the batting and a 4" x 4" ferro plate (12) was placed on top the foam. A one pound weight was placed in the center of the ferro plate for one minute, after which the weight and ferro plate were removed.

For the cigarette test a king-size non-filter-tipped cigarette (Pall Mall) was lighted, laid diagonally across the 4" x 4" foam sample, and allowed to burn completely. For the methenamine tablet test, a tablet was placed in the center of the foam sample, ignited with a paper match and allowed to burn until consumed or until all visible flame had disappeared. The hood was closed with the exhaust fan off during the testing.

After all visible evolution of smoke had ceased from the foam-batting composite, the exhaust fan was turned on to remove smoke and fumes, the hood was opened and the foam and batting inspected visually. Results were as follows:

Cigarette test: foam formulation No. 1

¼"—Burn through at tail end of cigarette. Slight brown spot on batting at that point. Cigarette ash light gray in color.
⅜"—No burn through, no visible discoloration of batting over entire length of cigarette. Cigarette ash light gray in color.

Cigarette test: foam formulation No. 2

¼"—Burn through at tail end of cigarette. Black spot on batting at tail end and brown discoloration full length of cigarette. Cigarette ash white in color.
⅜"—No burn through, light brown discoloration of batting full length of cigarette, darker in color at tail end. Cigarette ash white in color.

Cigarette test: foam formulation No. 3

¼"—No burn through, slight brown discoloration of batting full length of cigarette. Cigarette ash dark gray.
⅜"—No burn through, no visible discoloration of batting full length of cigarette. Cigarette ash medium gray in color.

Cigarette test: foam formulation No. 4

¼"—No burn through but black spot at tail end, both on foam and batting. Cigarette ash dark gray in color.
⅜"—No burn through, light brown discloroation of batting at tail end of cigarette. Cigarette ash dark gray in color.

In none of the above tests was the cotton batting ignited by the glowing cigarette.

Methenamine tablet test: foam formulations Nos. 1 and 2

¼″—Entire foam sample burned, igniting batting which smoldered to ash. Since battings ignited, second test not run.

Methenamine tablet test: foam formulation No. 3

¼″—About half of foam sample burned, igniting batting as above. (Two tests gave identical results.)
¾″—Burn area about 2 inch diameter, ⅝″ deep. Very light brown discoloration of foam on bottom, no discoloration of batting. Foam formed char across top of burn area, pill fell through char and flame extinguished. Pill not totally consumed.

Methanamine tablet test: foam formulation No. 4

¼″—Burn area approximately 1 inch diameter. Black char crust on bottom of foam sample. One-half inch diameter black char area on batting but not ignition of batting. (Two tests gave identical results.)
¾″—Burn area about 1 inch diameter, ½″ deep. No discoloration on bottom of foam or on batting. Pill fell through char across burn area and was extinguished before being completely consumed.

(11) Hexamethylene tetraamine, Ely Lilly & Co. Reagent Tablet No. 1588 for timed burning. See, also, "The Merck Index," Seventh Edition, Merck & Co., Inc., Rahway, N.J., 1960, page 665.

(12) Steel plate chrome plated on one side.

The results of the cigarette tests shows that Foam No. 4 of the present invention was much better with respect to fire resistance than Foams 1 and 2 and was as good as or better than Foam 3. The results of the methenamine tablet tests showed that Foam No. 4 of the present invention was very much better with respect to fire resistance than Foams 1 and 2 and much better than Foam 3.

EXAMPLE III

A polyetherurethane foam was prepared generally according to the procedures of Examples I and II, above. The formulation of the foam was as follows:

| Ingredient: | Parts by weight |
|---|---|
| Poly G-3030 PG* | 100.0 |
| H₂O, deionized | 2.2 |
| L-540* | 8.0 |
| T-9* | 0.5 |
| Triethylene diamine | 0.2 |
| Polyvinyl chloride resin ¹ | 20.0 |
| Cereclor 42 ² | 10.0 |
| Aluminna trihydrate* | 50.0 |
| Antimony trioxide* | 5.0 |
| Freon 11 ¹ | 10.0 |
| Tolylene diisocyanate* | 31.5 |

¹ Example II, above, Formulation No. 4.
² Chlorinated paraffin, liquid, approximate molecular weight of 530, contains about 42% by weight of chlorine, viscosity of about 25 poises at 25° C., I.C.I. America, Inc.
*See Example I, above.

The properties of the resulting foam on testing were as follows:

| | |
|---|---|
| Density (lbs./ft.³) | 3.35 |
| Tensile strength (p.s.i.) | 10.5 |
| Elongation (percent) | 120 |
| Tear strength (p.l.i.) | 1.10 |
| Comp. load defl.: | |
| 25% | 32.0 |
| 65% | 82.2 |
| 25% R | 27.5 |
| Compression set (percent) (50% Method B) | 9.5 |
| Flammability (ASTM D-1692-68) | (¹) |
| Initial rate (″/min.) | 0.80 |
| After heat aging (″/min.) (22 hrs. @ 284° F.) | 0.75 |
| Weight loss after heat aging (percent) (22 hrs. @ 284° F.) | 0.4 |

¹ Self ext. 207 sec.

This example shows that substantially the same results are obtained when part of the halogen-containing polymer is replaced with a chlorinated paraffin.

EXAMPLE IV

Additional polyetherurethane foams were prepared by the general methods of Examples I to III, above. Polyetherpolyol masterbatches were prepared as follows:

| | Masterbatch (parts by weight) | |
|---|---|---|
| Ingredient | A | B |
| Poly G-3030 PG* | 96.0 | 96.0 |
| Alumina trihydrate ¹ | 50.0 | 50.0 |
| Polyvinyl chloride resin ¹ | 20.0 | |
| Polyvinyl chloride resin ² | | 20.0 |
| Antimony trioxide* | 5.0 | 5.0 |

Note.—For footnotes see Example I.

The other ingredients of the foam formulations were then mixed into the masterbatches in the order and amounts shown below, and the resulting mixtures were allowed to foam.

| Ingredient | Run 1A | Run 1B |
|---|---|---|
| Masterbatch: | | |
| A | 171.0 | |
| B | | 171.0 |
| Cereclor 42 ³ | 10.0 | 10.0 |
| Triethylene diamine solution (5% by weight of DABCO in Poly G-3030 PG) | 4.0 | 4.0 |
| H₂O deionized | 2.2 | 2.2 |
| L-540* | 0.8 | 0.8 |
| T-9* | 0.5 | 0.5 |
| Freon 11 ¹ | 10.0 | 10.0 |
| Tolylene diisocyanate* | 31.5 | 31.5 |
| Cream time, secs | 11.5 | 11 |
| Rise time, secs | 255 | 259 |
| Tack free time, mins | 6 | 6 |

Note.—For footnotes see the following table.

After curing, samples of the foams were tested for flammability (ASTM D-1692-68), and the following results were obtained:

| | Self ext. time (sec.) | Amount of burn, inches | Comments |
|---|---|---|---|
| Run 1A: | | | |
| Sample 1 | 203 | 2.75 | Charred and no dripping. |
| Sample 2 | 211 | 2.75 | Do. |
| Run 1B: | | | |
| Sample 1 | 145 | 2.00 | Do. |
| Sample 2 | 157 | 1.88 | Do. |

¹ See Example II, above, Formulation No. 4.
² Vygen 3019, The General Tire & Rubber Company, intrinsic viscosity of about 1.06, particle size about 98% through a 200 mesh, and 2% retained on a 200 mesh (about 74 microns) screen, suspension polymerized.
³ See Example III, above.
*See Example I, above.

These results show that replacement of part of the halogen-containing polymer with a chlorinated paraffin still gives useful foams having self-extinguishing properties. On the other hand when all of the halogen-containing polymer is replaced with the chlorinated paraffin, the resulting foams exhibit poor cell structure, tend to collapse, show poor charring, and are not self-extinguishing.

EXAMPLE V

Additional polyetherurethane foams were prepared by and tested by the method of Run B, Example I, above, in which the parts are parts by weight. In these foams the polyvinyl chloride, alumina trihydrate and/or antimony trioxide were omitted, except in the control Run No. 28.

After curing and cooling, samples were cut from the foams and they were given various tests to show their physical properties and resistance to flammability.

The ingredients of the foam formulations and the results obtained on testing the flexible foams are shown in the table below:

TABLE

| Run number | 21 | 22 | 23 | 24 | 25 | 26 | 27 | 28 |
|---|---|---|---|---|---|---|---|---|
| Foam ingredients, parts by weight: | | | | | | | | |
| Poly G-3030 PG* | 100.0 | 100.0 | 100.0 | 100.0 | 100.0 | 100.0 | 100.0 | 100.0 |
| H₂O (deionized) | 2.5 | 2.5 | 2.5 | 2.5 | 2.5 | 2.5 | 2.5 | 2.5 |
| L-540* | 0.75 | 0.75 | 0.75 | 0.75 | 0.75 | 0.75 | 0.75 | 0.75 |
| T-9* | 0.50 | 0.50 | 0.50 | 0.50 | 0.50 | 0.50 | 0.50 | 0.50 |
| A-1* | 0.1 | 0.1 | 0.1 | 0.1 | 0.1 | 0.1 | 0.1 | 0.1 |
| Polycat 12* | 0.2 | 0.2 | 0.2 | 0.2 | 0.2 | 0.2 | 0.2 | 0.2 |
| Marvinol 51* | | 20.0 | | | 20.0 | 20.0 | | 20.0 |
| Alumina trihydrate* | | | 50.0 | | | 50.0 | 50.0 | 50.0 |
| Antimony trioxide* | | | | 3.0 | 3.0 | | 3.0 | 3.0 |
| Dactol* | 5.0 | 5.0 | 5.0 | 5.0 | 5.0 | 5.0 | 5.0 | 5.0 |
| TDI* | 36.0 | 36.0 | 36.0 | 36.0 | 36.0 | 36.0 | 36.0 | 36.0 |
| Foam properties, density (lbs./ft.³) | 2.34 | 2.45 | 3.18 | 2.2 | 2.75 | 3.55 | 3.26 | 3.64 |
| Comp. load deflection: | | | | | | | | |
| CLD 25% | 27.5 | 22.5 | 30.0 | 17.5 | 23.8 | 40.0 | 32.5 | 42.5 |
| CLD 65% | 55.0 | 56.3 | 73.8 | 38.8 | 66.3 | 104 | 75.0 | 111.0 |
| CLD 25% R | 21.3 | 20.0 | 25.0 | 13.8 | 20.0 | 32.5 | 26.3 | 33.8 |
| Comp. set (50%, method B), percent | 6.5 | 12.1 | 13.2 | 31.8 | 15.5 | 11.3 | 11.7 | 10.6 |
| Flammability (ASTM D-1692-68) | Burns | Burns | Burns | Burns | Burns | Burns | Burns | (a) |
| After heat aging (22 hrs. at 284° F.) | Burns | Burns | Burns | Burns | Burns | Burns | Burns | (b) |
| Weight loss after heat aging (percent) (22 hrs. at 284° F.) | 0.5 | 0.5 | 0.37 | 0.51 | 0.4 | 0.34 | 0.37 | 0.37 |
| Tensile strength (p.s.i.) | 12.7 | 12.7 | 10.3 | 10.0 | 10.0 | 11.3 | 10.7 | 11.7 |
| Elongation (percent) | 170 | 120 | 123 | 140 | 103 | 90 | 107 | 83 |
| Tear strength (p.l.i.) | 1.70 | 1.70 | 1.55 | 1.75 | 1.80 | 1.68 | 1.77 | 1.70 | a Self extinguishing time 175 seconds.
b Self extinguishing time 126 seconds.
*The same as Example I, above.

The above data clearly show the improvement in flame resistance imparted to polyurethane foams containing a halogen-containing resin, antimony trioxide and alumina trihydrate. Other foams similarly prepared but omitting one or more of the ingredients such as the polyvinyl chloride, alumina trihydrate and/or the antimony trioxide burned; for example, they did not exhibit any self-extinguishing properties, when tested according to the foregoing test.

The embodiments of the invention in which an exclusive property or privilege is claimed are defined as follows:

1. In the method of making a flame retardant flexible or semiflexible low density, polyurethane foam by the reaction of (A) a polyetherpolyol having from two to four hydroxyl groups and having a molecular weight of from about 1000 to 10,000, (B) an organic polyisocyanate and (C) a blowing agent comprising water in the admixture with (D) a surfactant and (E) a catalyst, using the one-shot or prepolymer process, the improvement comprising incorporating in said formulation as essential flame retardant additives (I) from about 2 to 100 parts by weight per 100 parts by weight of said polyol of a finely divided, solid halogen-containing polymeric resin having an intrinsic viscosity of from about 0.25 to 2.5, (II) finely divided alumina trihydrate in an amount of from about 30 to 80 parts by weight per 100 parts by weight of said polyol, and (III) finely divided antimony trioxide in an amount of from about 1 to 20 parts by weight per 100 parts by weight of said polyol.

2. The method according to claim 1 in which the polyol A is a polyalkylene ether polyol, the catalyst comprises a tertiary amine in an amount of from 0.05 to 0.9 part by weight per 100 parts by weight of said polyol and from about 0.1 to 0.9 part by weight per 100 parts by weight of said polyol of a metal-containing polyurethane catalyst.

3. The method according to claim 2 in which the resin (I) is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is used in an amount of from about 5 to 50 parts by weight, the alumina trihydrate (II) is used in an amount of from about 45 to 75 parts by weight and the antimony trioxide (III) is used in an amount of from about 3 to 15 parts by weight, the amounts of said (I), (II) and (III) being based on 100 parts by weight of said polyol.

4. The method according to claim 3 in which the resin (I) is polyvinyl chloride.

5. The method according to claim 4 in which the metal-containing catalyst is stannous octoate.

6. The method according to claim 1 wherein from about 5 to 70% by weight of a chlorinated paraffin is used to replace an equal amount by weight of said halogen-containing polymeric resin (I), staid chlorinated paraffin having an average molecular weight of from about 250 to 1400 and containing from about 40 to 70% by weight of chlorine.

7. A flame retardant low density, flexible or semi-flexible polyetherurethane foam, the ether moieties of said foam being derived from polyols having a molecular weight of from about 1,000 to 10,000 and from 2 to 4 hydroxyl groups containing as essential flame retardant additives, based on 100 parts by weight of said polyol, (I) from about 2 to 100 parts by weight of a finely divided, solid halogen-containing polymeric resin having an intrinsic viscosity of from about 0.25 to 2.5, (II) finely divided alumina trihydrate in an amount of from about 30 to 80 parts by weight, and (III) finely divided antimony trioxide in an amount of from about 1 to 20 parts by weight.

8. A foam according to claim 7 in which the polyol is a polyalkylene ether polyol and the catalyst includes, based on 100 parts by weight of said polyol, a tertiary amine present in an amount of from about 0.05 to 0.9 part by weight and a metal-containing polyurethane catalyst present in an amount from about 0.1 to 0.9 part by weight.

9. A foam according to claim 8 in which the resin (I) is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is present in an amount of from about 5 to 50 parts by weight, the alumina trihydrate (II) is present in an amount of from about 45 to 75 parts by weight, and the antimony trioxide (III) is used in an amount of from about 3 to 15 parts by weight, the amounts of said (I), (II) and (III) being based on 100 parts by weight of said polyol.

10. A foam according to claim 9 in which the resin (I) is polyvinyl chloride.

11. A foam according to claim 10 in which the metal-containing catalyst is stannous octoate.

12. A foam according to claim 7 wherein from about 5 to 70% by weight of a chlorinated paraffin is used in place of an equal amount by weight of said halogen-containing polymeric resin (I), said chlorinated paraffin having an average molecular weight of from about 250 to 1400 and containing from about 40 to 70% by weight of chlorine.

13. A foam according to claim 12 wherein said chlorinated paraffin is a liquid.

14. The method according to claim 6 wherein said chlorinated paraffin is a liquid.

References Cited

UNITED STATES PATENTS

| 3,574,149 | 4/1971 | Harrington | 260—2.5 AJ |
| 3,075,928 | 1/1963 | Lanham | 260—859 PV |
| 3,262,894 | 7/1966 | Green | 260—2.5 AJ |

MAURICE J. WELSH, Primary Examiner

U.S. Cl. X.R.

260—2.5 BE, 2.5 AK

PO-1050
(5/69)

UNITED STATES PATENT OFFICE
CERTIFICATE OF CORRECTION

Patent No. 3,810,851     Dated May 14, 1974

Inventor(s) Arthur J. Norman and David S. Cobbledick

It is certified that error appears in the above-identified patent and that said Letters Patent are hereby corrected as shown below:

Column 4, lines 16-17, which reads: "dipropylene glycol, trimethylolpropane," should read ---dipropylene glycol, glycerol, trimethylolpropane,---.

Column 7, line 31, which reads: "foam" should read ---foams---.

Column 8, line 27, which reads: "were omitted" should read ---was omitted---.

Columns 7 & 8, (Table), which reads: "Weight loss after heat aging (percent) (22 hrs. at 284°F.)--3.0" should read ---Weight loss after heat aging (percent) (22 hrs. at 284°F.)--0.3---.

Signed and sealed this 24th day of December 1974

(SEAL)
Attest:

McCOY M. GIBSON JR.
Attesting Officer

C. MARSHALL DANN
Commissioner of Patent